DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 422

T896,031

PICTORIAL PARALLAX PANORAMAGRAM INCLUDING A CELLULOSE ESTER HOT MELT THERMOPLASTIC VIEWING SCREEN

Harris N. Stephens, Jr., P.O. Box 511, Kingsport, Tenn. 37662

Continuation of application Ser. No. 846,621, July 31, 1969, which is a continuation-in-part of application Ser. No. 758,114, Sept. 6, 1968. This application Mar. 12, 1971, Ser. No. 123,875

Int. Cl. B44c *1/20;* D21h *1/42;* G02b *27/22*

U.S. Cl. 117—10

No Drawing. 11 Pages Specification

A cellulose ester coating composition suitable for coating substrates such as paper which contain printed lineiform images is embossed with a lens-like surface pattern to produce a pictorial parallax panoramagram. The composition contains between about 65–85% by weight of cellulose acetate butyrate, having a butyryl content greater than 38% by weight together with about 15–35% by weight of a plasticizer having a boiling point of at least 325° C. As a hot melt at 375° F., the composition has a viscosity of between about 2,000 and 50,000 centipoises and a melt stability of between about 1.0 and 1.6 hours.